Sept. 26, 1950 P. SERENO 2,523,785
RESILIENT CLAMPING DEVICE FOR FRAMEWORK ELEMENTS
Filed Aug. 20, 1946
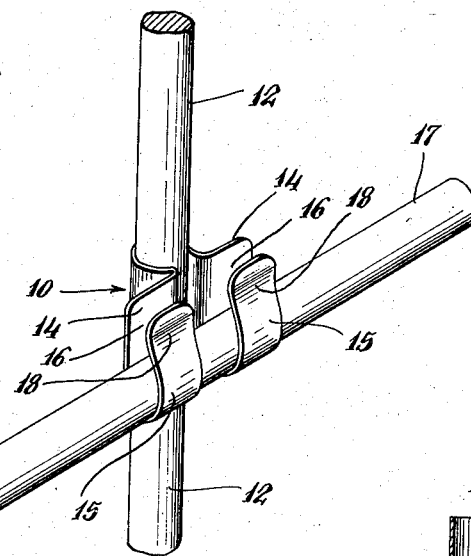
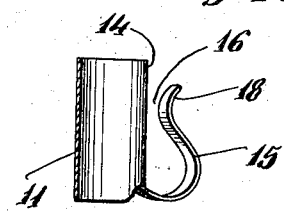
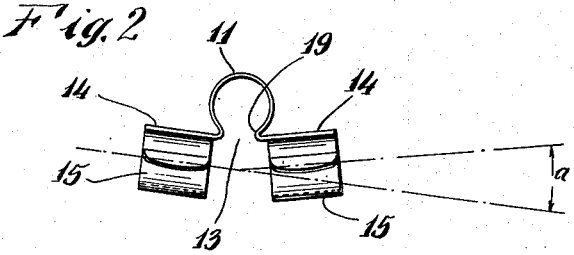
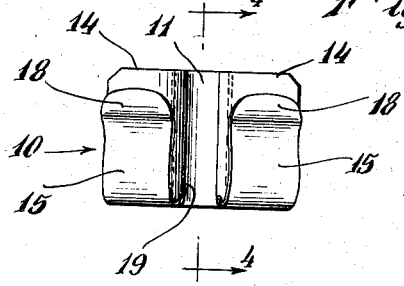
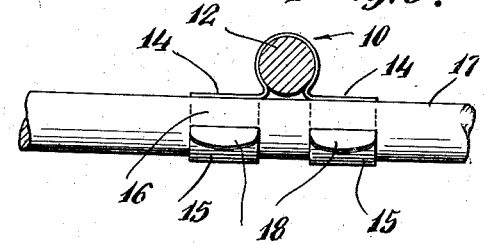
INVENTOR.
PAOLO SERENO
BY Edgar Luzzatto
his Agent Patented Sept. 26, 1950

2,523,785

UNITED STATES PATENT OFFICE 2,523,785

RESILIENT CLAMPING DEVICE FOR FRAMEWORK ELEMENTS

Paolo Sereno, New York, N. Y.

Application August 20, 1946, Serial No. 691,683

2 Claims. (Cl. 24—81)

This invention relates to a clamping device for releasably coupling elements of a constructional framework in fixed angular relationship.

I preferably contemplate to employ a clamping device according to my invention in the erection of disassemblable temporary frameworks, particularly display scaffoldings, in the assembly of toy construction sets, and in general wherever it is necessary or desirable to use a clamping device that can be manufactured in small sizes at a reasonable cost, that is extremely quick and easy to apply and to remove, and that is not cumbersome or unsightly. However it is to be understood that the usefulness of my clamping device is not limited to the applications above pointed out, as the device can be manufactured in any size and applied to any type of constructional framework whatsoever, although its novel characteristics and its specific advantages over the clamps of the prior art may be more important in some applications than in others.

The general object of my invention is to provide a new and improved clamping device, hereinafter called "clamp," that is of particularly simple structure and is extremely easy and quick to apply and to remove and economical to manufacture.

A more specific object is to provide a clamp consisting of one solid piece suitably shaped, and which therefore embodies no movable parts and requires no manipulations to be applied and removed.

Another object is to provide a clamp which is applied and removed by taking advantage of its resiliency, but which when applied develops a clamping pressure sufficient to bear relatively high loads.

A further object is to provide a clamp which when applied to a substantially vertical element will exert thereon a temporary clamping pressure sufficient to hold the clamp in place, and which, when a substantially horizontal element constituting or bearing a vertical load is introduced therein, will develop a greater permanent clamping pressure on said substantially vertical element, said permanent clamping pressure being sufficient to withstand the total vertical load.

A still further object is to provide a clamp which can be applied in the shortest possible time and can be used by unskilled persons and particularly by children.

A still further object is to provide a clamp which occupies a minimum of space and is quite inconspicuous, and which is therefore particularly suitable for advertising displays and in general for structures which should present an attractive appearance.

A still further object is to provide a clamp operating in such a manner as to have no tendency to deform or damage the elements it engages.

Other related and ancillary objects of my invention will become apparent as the description proceeds.

In the drawings:

Fig. 1 is perspective view of a clamp according to my invention applied to two perpendicular cylindrical elements.

Fig. 2 is a plan view of the clamp alone.

Fig. 3 is a front view of the clamp alone.

Fig. 4 is a vertical section of the clamp taken on the line 4—4 of Fig. 3.

Fig. 5 is a plan view of the assembly of Fig. 1.

The particular preferred embodiment of my invention which I have chosen to illustrate in the drawings and to describe hereinafter is a clamp adapted to couple tubes or cylindrical rods at right angles to each other. In practice this will be the most common case, but need not be the only one, and my invention may be applied to the coupling of elements having a cross-section other than circular, or to the coupling of elements at an angle other than 90°, through modifications which will require the exercise of no more than mechanical skill and will be readily apparent to persons skilled in the art.

Referring now in detail to the drawings, 10 generally designates a clamp according to my invention, which is preferably formed of one piece of resilient material, such as spring steel or the like, but could also be made of a number of parts interconnected in any suitable manner to achieve substantially the structure shown. A first or vertical arcuate recess or seat 11 is formed in the clamp. Said seat 11 is substantially circular in cross-section, or has any other shape that may be suggested or appear desirable in relation to the shape of the element to be received therein. In Figs. 1 and 5 said element is designated by the numeral 12, and is illustrated as a cylindrical rod. The recess 11 has a longitudinal opening 13 limited by shoulders 19 for the lateral introduction of the element 12. Usually I find it desirable that the opening 13 be of smaller width than the element 12, so that the latter will have to be forced therethrough, spreading apart the shoulders 19, to penetrate into the seat 11, as is rendered possible by the resiliency of the material of the clamp. Generally I find that a narrower opening and a greater depth of the seat 11 aid the clamping action. However the character of my clamp and the mode of operation thereof, to be explained later, are such that there is a certain flexibility in its allowable design, and consequently the precise shape and depth of the seat 11 and the precise size of the opening 13 are matters of judicious choice.

At each side of the seat 11 there is an extension or vertical plate 14 which curls upwardly at the bottom thereof to form a prong 15. Each prong 15 curls towards the corresponding plate 14, leaving at its nearest point thereto a gap 16 which is preferably narrower than the diameter of an element 17 that is to be engaged by the prongs 15. The top portion 18 of each prong 15 preferably has a reverse curve to guide the element 17 into the prong. The profile of each prong 15, best seen in side elevation in Fig. 4, depends on the shape of the element 17. In the embodiment illustrated said element 17 is a cylindrical rod of circular cross-section, and therefore each prong 15 comprises an approximately circular portion.

The two prongs 15 together constitute, in cooperation with the respective plates 14, a horizontal recess or seat for the horizontal element 17. However when the clamp is not applied the two prongs are not alined, that is, when viewed in plan as in Fig. 2, they form a slight angle "$a$" with each other, which angle can be precisely defined as the angle formed by the axes of the two prongs 15. The planes of the two plates 14 may make the same angle "$a$" with one another, as in the drawings, but need not necessarily do so. The precise degree of said angle "$a$" is a matter of judicious choice, and is related to other factors, such as the thickness and size of the clamp, the material thereof, the load it is to carry, and the shape of the vertical seat 11 and of other parts of the clamp.

The operation of the clamp is as follows. First the clamp is engaged with the element 12. The seat 11 is so dimensioned that, by reason of the resiliency of its material, it immediately exerts upon said element 12 a temporary clamping pressure sufficient to hold the clamp firmly in place. Then the element 17 is introduced from the top into the seat defined by the prongs 15 in cooperation with the plates 14. If the element 17 is straight, it will force the prongs 15 to become alined. Since these latter are fast to the plates 14, the whole clamp will become deformed in such a manner as to tend to close the opening 13 and to narrow the seat 11. The presence of the element 12 in the seat 11 will prevent the narrowing of said seat. As a result, a greater clamping pressure will develop in the seat 11 upon the element 12, and this greater clamping pressure will be permanent as long as the two elements remain engaged in the clamp and will be sufficient to bear the weight of the element 17 and the vertical load, if any, carried thereby. Concurrently elastic bending will occur in the shoulders 19 as the plates 14 follow the relative displacement of the prongs 15.

The prongs 15 underlying the element 17 support the same. However said prongs are preferably so dimensioned as to exert a moderate clamping pressure on said element by virtue of their resiliency, in order to hold said element 17 against lateral displacement, firmly to maintain the same in invariable positioned relationship to the element 12 without any play, and to withstand a portion of the vertical load if said element 17 is not exactly vertical.

In the embodiment illustrated, as seen in Fig. 5, the two elements 12 and 17 do not touch each other. A contact between them would not necessarily be harmful. However, should the seat 11 be too shallow and the element 12 protrude excessively therefrom, this might lead to excessive deformation of the prongs 15 upon introduction of the element 17 therein, might render said introduction strained and difficult, and might lead to objectionable and damaging friction between the two elements.

The exact amount of the permanent clamping pressure on the element 12 depends on several factors, chiefly on the thickness of the clamp, the elastic properties of the material of which it is made, the angle "$a$", and the shape of the shoulders 19 and their radius of curvature, if they have a measurable radius of curvature. Obviously, the clamping pressure will be greater if the clamp is thicker, the angle "$a$" is larger, and the shoulders 19 are less yieldable to bending stresses.

While only two prongs 15 have been illustrated, as the clamp will operate efficiently when so constructed, it is apparent that a greater number could be provided, and that many other variations could be introduced in the precise shape and arrangement of the members constituting the seat for the element 17.

The element 17 has been illustrated herein as being a straight rod. If it were not straight, that is if the portions thereof engaging the two prongs 15 made an angle "$b$" with each other, the two prongs 15 would have to make an angle "$c$" with each other different from "$b$", and the difference of the angles "$b$" and "$c$" would take the place of the angle "$a$" in all the above considerations. Also, the elements 12 and 17 have been designated respectively as "vertical" and "horizontal," but a certain departure of either or both from a plumb and a level line respectively are permissible without interfering with the operation of the clamp, the exact extent of such permissible departures being variable from case to case. The expressions "substantially vertical" and "substantially horizontal" whenever used in the claims are to be construed as embracing any such permissible departures.

While I have described and illustrated one preferred embodiment of my invention, it is to be understood that many changes and modifications may be made therein, other than those explicitly pointed out, without departing from the spirit of the invention and without exceeding the scope of the claims.

I claim:

1. A clamping device of the character described, comprising an open-ended, tubular, elongated resilient member having one side thereof open over its entire length and adapted to loosely receive a rigid elongated element, and two means, one connected adjacent one edge of the open side and the other connected adjacent the other edge of the open side, said two means being adapted to frictionally seat a rigid second element crossing said first element, said two means normally being disaligned and being relatively disposed at an obtuse angle of less than 180° facing said member, said two means being relatively angularly displaceable into alignment to seat said second element, whereby to cause said resilient member to exert a constricting pressure on said first named element so as to frictionally seat the same.

2. A clamping device as set forth in claim 1 wherein the member and two means are so relatively disposed that the two elements when seated are spaced apart.

PAOLO SERENO.

REFERENCES CITED

The following references are of record in the file of this patent:

UNITED STATES PATENTS

| Number | Name | Date |
|---|---|---|
| 606,461 | Johnson | June 28, 1898 |
| 645,037 | Kilmer et al. | Mar. 6, 1900 |
| 716,723 | Kilmer | Dec. 23, 1902 |
| 984,484 | Kordzikowski | Feb. 14, 1911 |
| 1,018,018 | Straus | Feb. 20, 1912 |
| 1,054,803 | Stiver | Mar. 4, 1913 |